US012726457B2

(12) United States Patent
Iwahori et al.

(10) Patent No.: US 12,726,457 B2
(45) Date of Patent: Sep. 1, 2026

(54) MANAGEMENT DEVICE AND MANAGEMENT METHOD

(71) Applicant: TOYOTA JIDOSHA KABUSHIKI KAISHA, Toyota (JP)

(72) Inventors: Kento Iwahori, Nagoya (JP); Shogo Yasuyama, Okazaki (JP); Noriyuki Hashimoto, Seto (JP); Yusuke Nomura, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 61 days.

(21) Appl. No.: 19/006,701

(22) Filed: Dec. 31, 2024

(65) Prior Publication Data

US 2025/0233845 A1 Jul. 17, 2025

(30) Foreign Application Priority Data

Jan. 16, 2024 (JP) ................................ 2024-004500

(51) Int. Cl.

| | |
|---|---|
| ***H04L 61/5007*** | (2022.01) |
| ***G06F 16/958*** | (2019.01) |
| ***H04L 67/12*** | (2022.01) |
| ***H04W 4/40*** | (2018.01) |

(52) U.S. Cl.
CPC ........ *H04L 61/5007* (2022.05); *G06F 16/958* (2019.01); *H04L 67/12* (2013.01); *H04W 4/40* (2018.02)

(58) Field of Classification Search
CPC .... H04L 61/5007; H04L 67/12; G06F 16/958
See application file for complete search history.

(56) References Cited

U.S. PATENT DOCUMENTS

| | | | | |
|---|---|---|---|---|
| 2017/0320529 | A1* | 11/2017 | Nordbruch | G05D 1/0212 |
| 2021/0321468 | A1* | 10/2021 | Zhang | H04W 76/12 |
| 2023/0367833 | A1* | 11/2023 | Kol | G06F 16/958 |

FOREIGN PATENT DOCUMENTS

| | | |
|---|---|---|
| JP | 2017-538619 A | 12/2017 |

* cited by examiner

*Primary Examiner* — Barbara B Anyan
(74) *Attorney, Agent, or Firm* — SoraIP, Inc.

(57) ABSTRACT

A management device for managing an Internet Protocol address includes a release unit that releases an Internet Protocol address assigned to one mobile body in order to move one mobile body when one mobile body terminates control of unmanned driving, and an allocation unit that assigns the released Internet Protocol address to another mobile body scheduled to initiate control of unmanned driving.

5 Claims, 7 Drawing Sheets

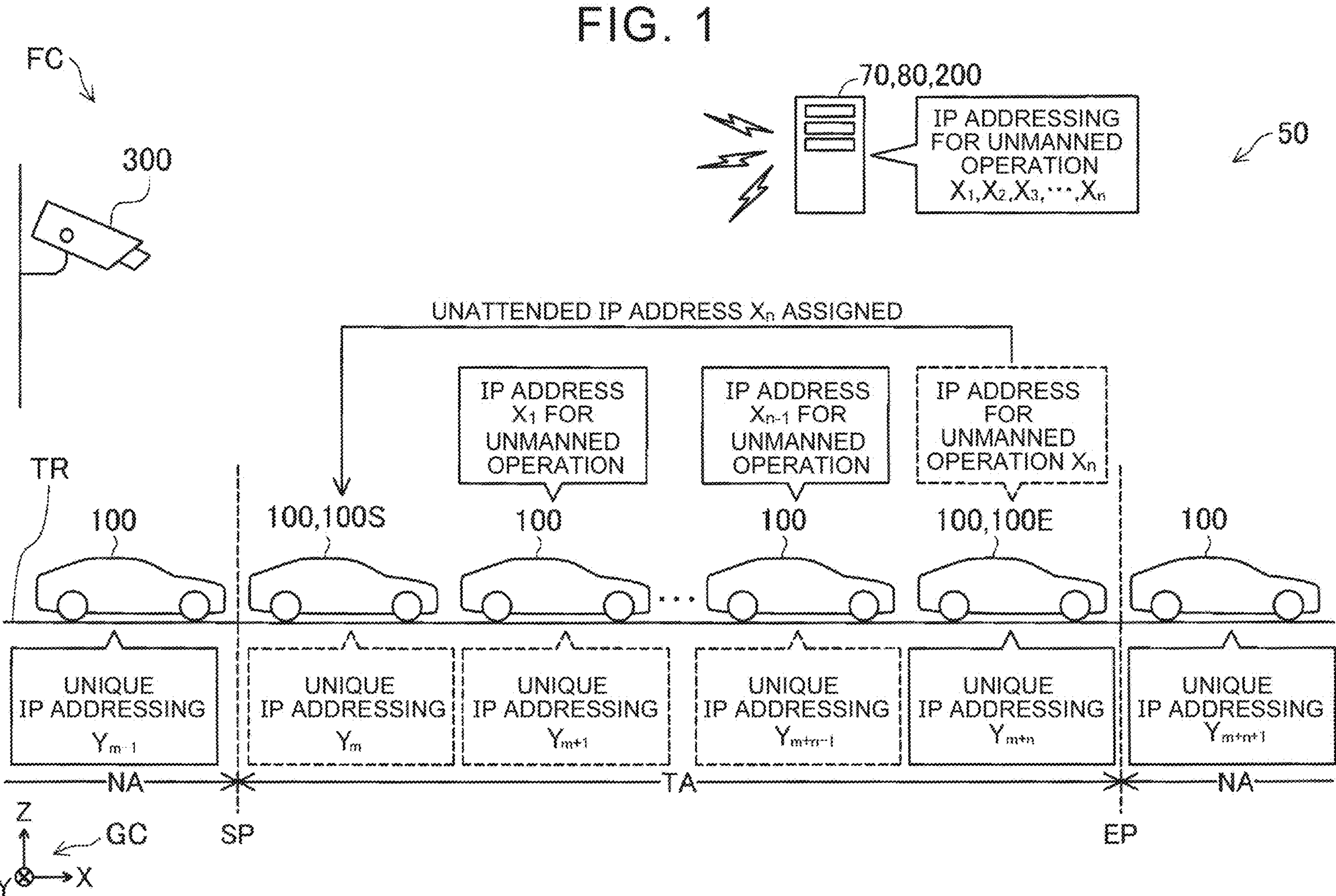
FIG. 1
FC
300
70,80,200
IP ADDRESSING FOR UNMANNED OPERATION $X_1, X_2, X_3, \cdots, X_n$
50
UNATTENDED IP ADDRESS $X_n$ ASSIGNED
IP ADDRESS $X_1$ FOR UNMANNED OPERATION
IP ADDRESS $X_{n-1}$ FOR UNMANNED OPERATION
IP ADDRESS FOR UNMANNED OPERATION $X_n$
TR
100
100,100S
100
100
100,100E
100
UNIQUE IP ADDRESSING $Y_{m-1}$
UNIQUE IP ADDRESSING $Y_m$
UNIQUE IP ADDRESSING $Y_{m+1}$
UNIQUE IP ADDRESSING $Y_{m+n-1}$
UNIQUE IP ADDRESSING $Y_{m+n}$
UNIQUE IP ADDRESSING $Y_{m+n+1}$
NA
TA
NA
Z
GC
Y
X
SP
EP

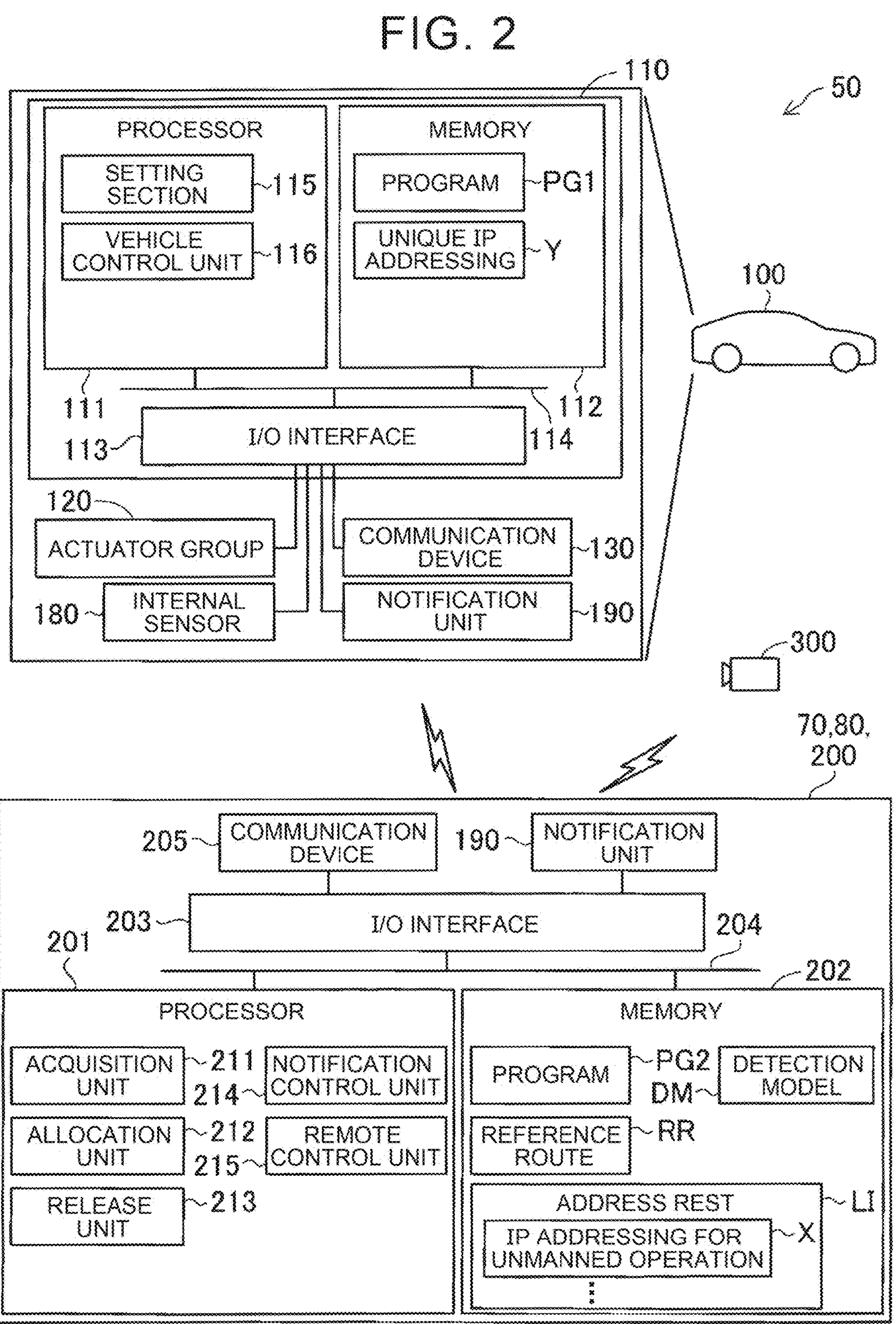
FIG. 2
110
50
PROCESSOR
SETTING SECTION
115
VEHICLE CONTROL UNIT
116
MEMORY
PROGRAM
PG1
UNIQUE IP ADDRESSING
Y
100
111
112
113
I/O INTERFACE
114
120
ACTUATOR GROUP
COMMUNICATION DEVICE
130
180
INTERNAL SENSOR
NOTIFICATION UNIT
190
300
70,80, 200
205
COMMUNICATION DEVICE
190
NOTIFICATION UNIT
203
I/O INTERFACE
204
201
202
PROCESSOR
ACQUISITION UNIT
211
NOTIFICATION CONTROL UNIT
214
ALLOCATION UNIT
212
REMOTE CONTROL UNIT
215
RELEASE UNIT
213
MEMORY
PROGRAM
PG2
DETECTION MODEL
DM
REFERENCE ROUTE
RR
ADDRESS REST
LI
IP ADDRESSING FOR UNMANNED OPERATION
X

FIG. 3

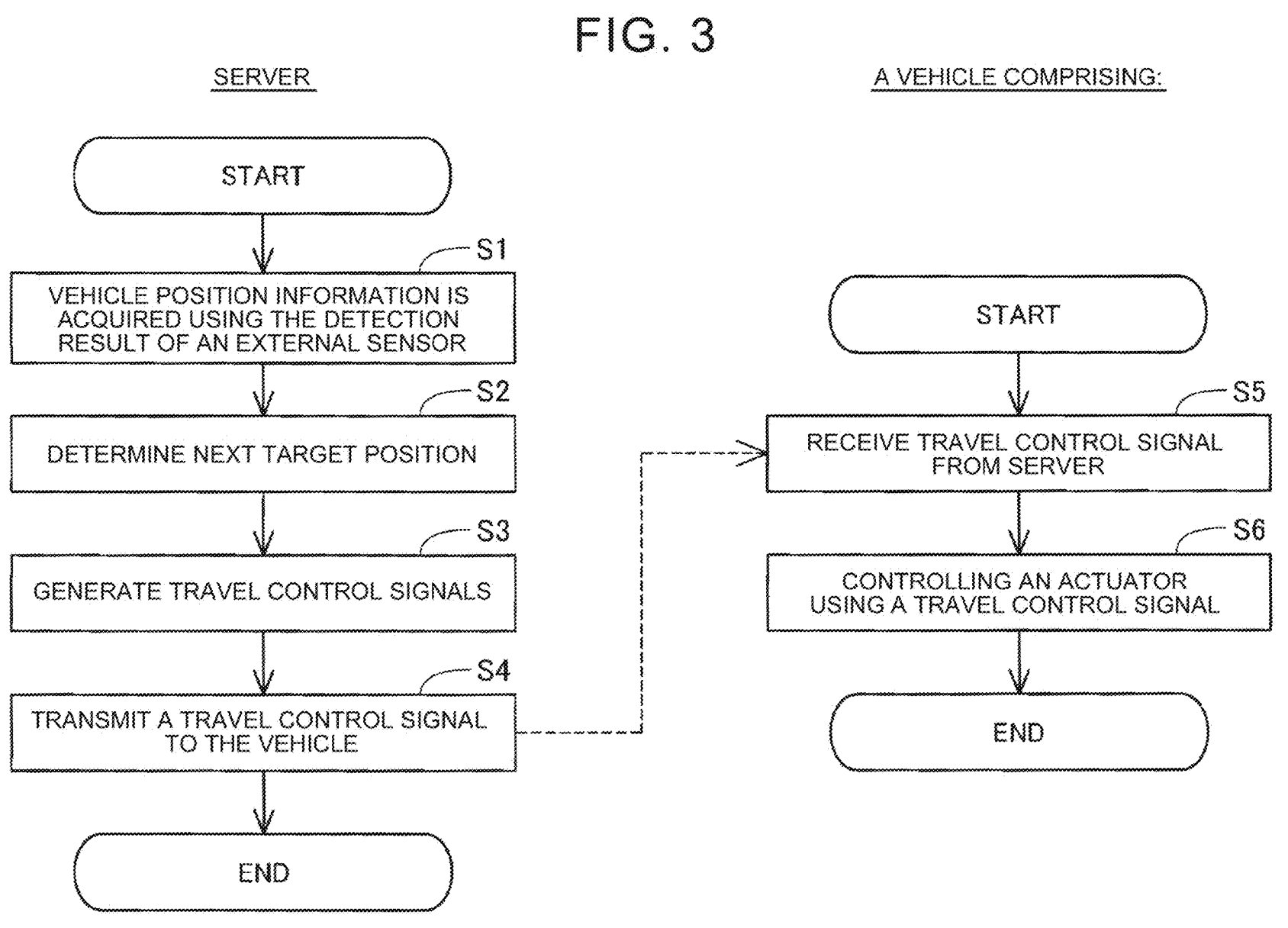

SERVER

START

S1 VEHICLE POSITION INFORMATION IS ACQUIRED USING THE DETECTION RESULT OF AN EXTERNAL SENSOR

S2 DETERMINE NEXT TARGET POSITION

S3 GENERATE TRAVEL CONTROL SIGNALS

S4 TRANSMIT A TRAVEL CONTROL SIGNAL TO THE VEHICLE

END

A VEHICLE COMPRISING:

START

S5 RECEIVE TRAVEL CONTROL SIGNAL FROM SERVER

S6 CONTROLLING AN ACTUATOR USING A TRAVEL CONTROL SIGNAL

END

FIG. 6

MANAGEMENT DEVICE AND MANAGEMENT METHOD

CROSS-REFERENCE TO RELATED APPLICATION

This application claims priority to Japanese Patent Application No. 2024-004500 filed on Jan. 16, 2024, incorporated herein by reference in its entirety.

BACKGROUND

1. Technical Field

The present disclosure relates to a management device and a management method.

2. Description of Related Art

There has conventionally been known a technique of driving a vehicle autonomously or through remote control (Japanese Unexamined Patent Application Publication (Translation of PCT Application) No. 2017-538619 (JP 2017-538619 A)). In this technology, data are transmitted and received between the vehicle and the outside via a communication network.

SUMMARY

In order to move a mobile body such as a vehicle through unmanned driving, data are occasionally transmitted and received between the mobile body and the outside via a communication network. In this case, it is conceivable to allocate an Internet Protocol address prepared in advance to the mobile body, in order to transmit and receive data between the mobile body and the outside. However, the number of Internet Protocol addresses is limited. There has not been proposed a technique of allocating a limited number of Internet Protocol addresses to mobile bodies, in order to move the mobile bodies through unmanned driving.

The present disclosure can be implemented in the following aspects.

(1) A first aspect of the present disclosure provides a management device. A management device that manages Internet Protocol (IP) addresses includes:

a release unit that releases an Internet Protocol address allocated to one mobile body to move the one mobile body when control of unmanned driving of the one mobile body is ended; and an allocation unit that allocates the released Internet Protocol address to another mobile body, of which the control of the unmanned driving is to be started. According to this aspect, the management device can allocate a limited number of Internet Protocol addresses to the mobile bodies without duplication in order to move the mobile bodies through unmanned driving.

(2) The management device according to the above aspect may further include a notification control unit that notifies a user of error information in at least one of a case where a predetermined time has elapsed from a time point at which the control of unmanned driving of the one mobile body is started and a case where a predetermined time has elapsed from a time point at which the Internet Protocol address is allocated to the one mobile body, and when the Internet Protocol address allocated to the one mobile body is allocated to the one mobile body without being released. According to this aspect, the management device can determine whether there is a problem with the management of the Internet Protocol addresses, according to at least one of the elapsed time from the time point at which the control of unmanned driving of one mobile body is started and the duration of use of an Internet Protocol address allocated to the one mobile body. When the management device determines that there is a problem with the management of the Internet Protocol addresses, the management device can notify the user of the error information.

(3) In the above aspect, the management device may manage a plurality of Internet Protocol addresses; and the management device may further include a notification control unit that notifies a user of error information when the number of mobile bodies being subjected to the control of unmanned driving and the number of Internet Protocol addresses allocated to the mobile bodies do not coincide with each other. According to this aspect, the management device can determine whether there is a problem with the management of the Internet Protocol addresses, by comparing the number of mobile bodies being subjected to the control of unmanned driving with the number of Internet Protocol addresses allocated to the mobile bodies. When the management device determines that there is a problem with the management of the Internet Protocol addresses, the management device can notify the user of the error information.

(4) In the above aspect, the mobile body may move for a section from a predetermined start point to an end point through the unmanned driving;

the release unit may determine whether the control of unmanned driving of the one mobile body is ended using position information on the one mobile body; and the position information may be acquired using at least one of a detection result output from an external sensor that detects the one mobile body from outside and a detection result output from an internal sensor mounted on the mobile body. According to this aspect, the management device can determine whether the control of unmanned driving of the one mobile body is ended using the position information on the one mobile body.

(5) A second aspect of the present disclosure provides a management method. A management method of managing Internet Protocol addresses includes:

releasing an Internet Protocol address allocated to one mobile body to move the one mobile body when control of unmanned driving of the one mobile body is ended; and allocating the released Internet Protocol address to another mobile body, of which control of unmanned driving is to be started. According to this aspect, a limited number of Internet Protocol addresses can be allocated to the mobile bodies without duplication in order to move the mobile bodies through unmanned driving.

(6) A third aspect of the present disclosure provides a management system. A management system that manages Internet Protocol addresses includes:

a sensor that detects a mobile body from outside;

a release unit that releases an Internet Protocol address allocated to one mobile body to move the one mobile body when control of unmanned driving of the one mobile body is ended; and an allocation unit that allocates the released Internet Protocol address to another mobile body, of which the control of the unmanned driving is to be started. According to this aspect, the management system can allocate a limited number of Internet Protocol addresses to the mobile bodies without duplication in order to move the mobile bodies through unmanned driving.

The present disclosure can be implemented in various forms other than the management device, the management system, and the management method described above. For example, the present disclosure can be implemented in the form of a method of manufacturing the management device and the management system, a method of controlling the management device and the management system, a computer program for implementing the control method, a non-transitory storage medium that stores the computer program, etc.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a conceptual diagram showing a configuration of a system according to a first embodiment;

FIG. 2 is a block diagram illustrating a configuration of a system according to the first embodiment;

FIG. 3 is a flowchart illustrating a processing procedure of travel control of a vehicle according to the first embodiment;

FIG. 6 is an explanatory view showing a schematic configuration of a device according to a second embodiment.

DETAILED DESCRIPTION OF EMBODIMENTS

A. First Embodiment

Figure 4:
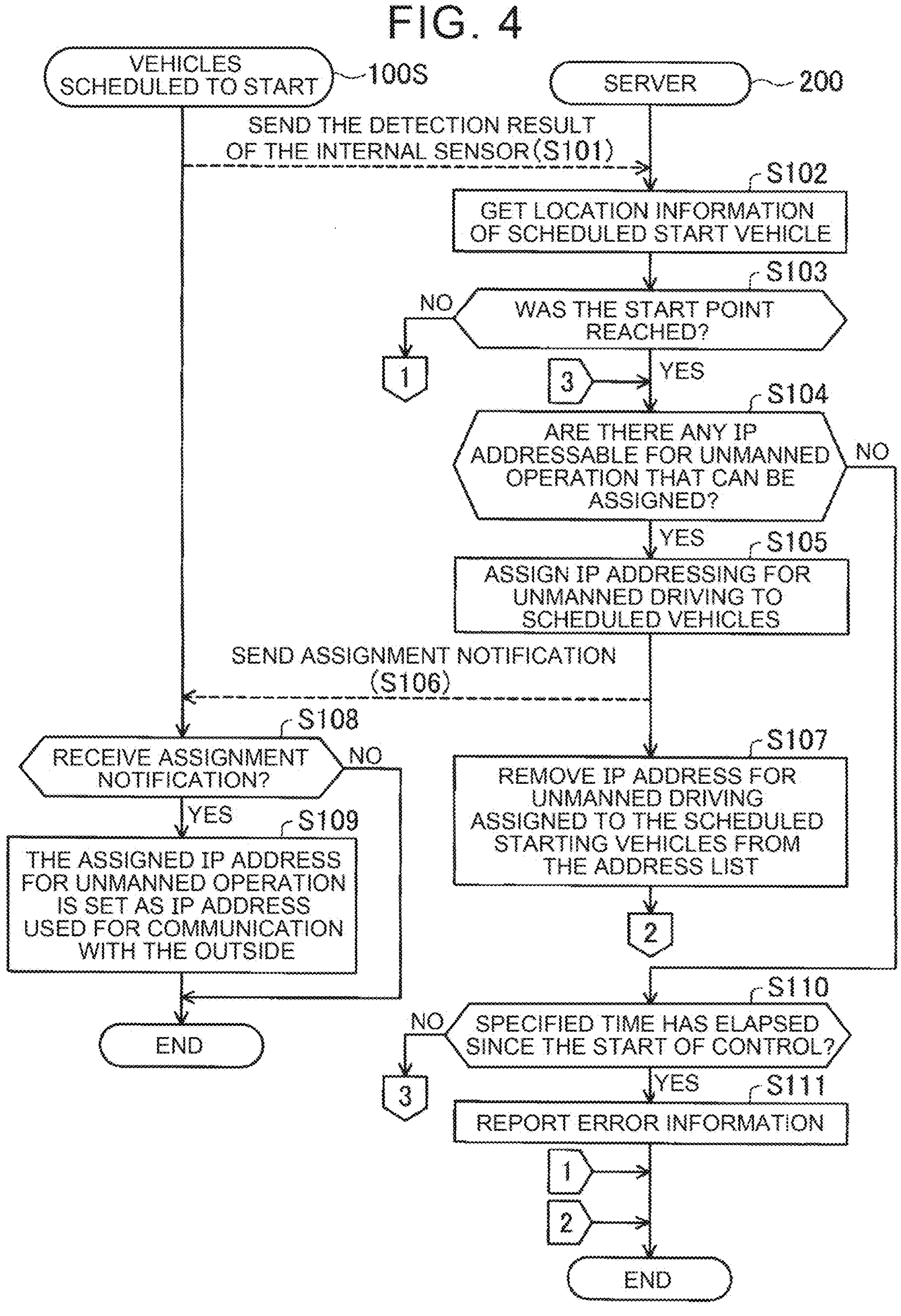
FIG. 4 is a flow chart illustrating an exemplary process for assigning Internet Protocol addressing for unmanned operation.

FIG. 1 is a conceptual diagram illustrating a configuration of a system 50 according to a first embodiment. The system 50 is a system for moving a mobile body by unmanned driving. The system 50 includes one or more vehicles 100 as a mobile body, one or more external sensors 300, a management device 70, and a remote control device 80. The management device 70 manages one or more unmanned driving Internet Protocol addresses X. The unmanned driving Internet Protocol address X is an Internet Protocol address prepared in advance for transmitting and receiving data between the vehicle 100 and the outside while the vehicle 100 is performing the control of the unmanned driving. In the present embodiment, the management device 70 manages a plurality of unmanned driving Internet Protocol addresses X. The remote control device 80 remotely controls the operation of the vehicle 100. In the present embodiment, the functions of the management device 70 and the remote control device 80 are realized by the server 200.

In the present disclosure, "mobile body" means a movable object, and is, for example, a vehicle or an electric vertical takeoff and landing machine (a so-called flying vehicle). The vehicle may be a vehicle traveling by a wheel or a vehicle traveling by an infinite track, and is, for example, a passenger car, a truck, a bus, a two-wheeled vehicle, a four-wheeled vehicle, a tank, a construction vehicle, or the like. Vehicles include battery electric vehicle (BEV), gasoline-powered vehicles, hybrid electric vehicle, and fuel cell electric vehicle. When the mobile body is other than the vehicle, the expressions of "vehicle" and "vehicle" in the present disclosure can be appropriately replaced with "mobile body", and the expression of "traveling" can be appropriately replaced with "moving".

The vehicle 100 is configured to be able to travel by unmanned driving. The term "unmanned driving" means driving that does not depend on the traveling operation of the passenger. The traveling operation means an operation related to at least one of "running", "turning", and "stopping" of the vehicle 100. The unmanned driving is realized by automatic or manual remote control using a device located outside the vehicle 100 or by autonomous control of the vehicle 100. A passenger who does not perform the traveling operation may be on the vehicle 100 traveling by the unmanned driving. The passenger who does not perform the traveling operation includes, for example, a person who is simply seated on the seat of the vehicle 100 and a person who performs a work different from the traveling operation such as an assembling operation, an inspection operation, and an operation of switches while riding on the vehicle 100. Driving by the traveling operation of the occupant is sometimes referred to as "manned driving".

Herein, "remote control" includes "full remote control" in which all of the operations of the vehicle 100 are completely determined from the outside of the vehicle 100, and "partial remote control" in which a part of the operations of the vehicle 100 is determined from the outside of the vehicle 100. Further, "autonomous control" includes "fully autonomous control" in which the vehicle 100 autonomously controls its operation without receiving any information from a device external to the vehicle 100, and "partially autonomous control" in which the vehicle 100 autonomously controls its operation using information received from a device external to the vehicle 100.

In the present embodiment, the vehicle 100 travels through the target section TA from the predetermined start point SP to the end point EP by unmanned driving in the factory FC for manufacturing the vehicle 100. The reference coordinate system of the factory FC is a global coordinate system GC, and any position in the factory FC can be represented by the coordinates of X, Y, Z in the global coordinate system GC. In the factory FC, a plurality of external sensors 300 are installed along the runway TR. The external sensor 300 is a sensor located outside the vehicle 100. In the present embodiment, the external sensor 300 is constituted by a camera. The camera as the external sensor 300 captures an image of the vehicle 100 and outputs a captured image as a detection result.

FIG. 2 is a block diagram illustrating a configuration of the system 50 according to the first embodiment. The vehicle 100 includes a vehicle control device 110, an actuator group 120 including one or more actuators, a communication device 130 for wirelessly communicating with an external device such as the server 200, and an internal sensor 180. The actuator group 120 includes an actuator of a driving device for accelerating the vehicle 100, an actuator of a steering device for changing a traveling direction of the vehicle 100, and an actuator of a braking device for decelerating the vehicle 100. The internal sensor 180 is a sensor mounted on the vehicle 100. The internal sensor 180 may include, for example, a sensor that detects a motion state of the vehicle 100, a sensor that detects an operation state of each unit of the vehicle 100, and a sensor that detects an environment around the vehicle 100. Specifically, the internal sensor 180 may include, for example, a camera, a LiDAR, a millimeter-wave radar, an ultrasonic sensor, a GPS sensor, an accelerometer, a gyroscope, and the like.

The vehicle control device 110 includes a computer including a processor 111, a memory 112, an input/output interface 113, and an internal bus 114. The processor 111, the memory 112, and the input/output interface 113 are bidirectionally communicably connected via an internal bus 114. An actuator group 120 and a communication device 130 are connected to the input/output interface 113. The processor 111 executes the program PG1 stored in the memory 112 to realize various functions including the functions of the setting unit 115 and the vehicle control unit 116.

The setting unit 115 sets an Internet Protocol address to be used for transmitting and receiving data between the vehicle 100 and the outside. As illustrated in FIG. 1, when the vehicle 100 travels in the target section TA, the vehicle 100 receives an assignment notification indicating the assigned unmanned driving Internet Protocol address X from the server 200. The setting unit 115 of the vehicle control device 110 mounted on the vehicle 100 that has received the assignment notification sets the unmanned driving Internet Protocol address X assigned by the server 200 as an Internet Protocol address used for communication with the outside. When the vehicle 100 travels in the non-target section NA, the vehicle 100 receives a cancellation notification indicating that the unmanned driving Internet Protocol address X has been cancelled from the server 200. The setting unit 115 of the vehicle control device 110 mounted on the vehicle 100 that has received the cancellation notification sets the unique Internet Protocol address Y stored in the memory 112 of the vehicle control device 110 as an Internet Protocol address used for communication with the outside. The unique Internet Protocol addresses Y are Internet Protocol addresses allocated to the respective vehicles 100 so as not to overlap among the vehicles 100. In the present embodiment, each of the unmanned driving Internet Protocol address X and the unique Internet Protocol address Y is an Internet Protocol address for accessing the communication device 130 mounted on the vehicle 100. When the vehicle 100 is being manufactured, the communication device 130 may not be mounted on the vehicle 100 or the function of the communication device 130 mounted on the vehicle 100 may not be realized. Therefore, when the vehicles 100 are being manufactured, the unmanned driving Internet Protocol address X and the unique Internet Protocol address Y may each be an Internet Protocol address for accessing the terminal device. The terminal device is a device detachably attached to the vehicle 100 in order to complement the function of the communication device 130 mounted on the vehicle 100.

The vehicle control unit 116 illustrated in FIG. 2 controls the actuator group 120 to cause the vehicle 100 to travel. The vehicle control unit 116 can cause the vehicle 100 to travel by controlling the actuator group 120 using the travel control signal received from the server 200. The travel control signal is a control signal for causing the vehicle 100 to travel. In the present embodiment, the travel control signal includes the acceleration and the steering angle of the vehicle 100 as parameters. In other embodiments, the travel control signal may include the speed of the vehicle 100 as a parameter in place of or in addition to the acceleration of the vehicle 100.

The server 200 includes a computer including a processor 201, a memory 202, an input/output interface 203, and an internal bus 204. The processor 201, the memory 202, and the input/output interface 203 are bidirectionally communicably connected via an internal bus 204. A communication device 205 for communicating with various devices external to the server 200 is connected to the input/output interface 203. The communication device 205 can communicate with the vehicle 100 by wireless communication, and can communicate with each external sensor 300 by wired communication or wireless communication. The processor 201 executes the program PG2 stored in the memory 202, thereby functioning as the acquisition unit 211, the allocation unit 212, the release unit 213, the notification control unit 214, and the remote control unit 215.

The acquisition unit 211 acquires position information of one vehicle 100 using at least one of a detection result output from the external sensor 300 including one vehicle 100 in the detection range and a detection result output from the internal sensor 180 mounted on one vehicle 100. Note that the acquisition unit 211 may acquire the position information of one vehicle 100 by using the detection result output from the internal sensor 180 that is mounted on another vehicle 100 and includes one vehicle 100 in the detection range.

The allocation unit 212 determines whether or not the scheduled start vehicle 100S has reached the start point SP at which the control of the unmanned driving is started, using the position information of the scheduled start vehicle 100S that is scheduled to start the control of the unmanned driving. When determining that the scheduled start vehicle 100S has reached the start point SP, the allocation unit 212 checks whether or not there is an unmanned driving Internet Protocol address X that can be allocated to the scheduled start vehicle 100S by referring to the address list LI stored in the memory 202 of the server 200. The allocation unit 212 assigns, to the scheduled start vehicle 100S, an unmanned driving Internet Protocol address X that can be assigned to the scheduled start vehicle 100S when there is an unmanned driving Internet Protocol address X that can be assigned to the scheduled start vehicle 100S. The allocation unit 212 transmits the assignment notification to the scheduled starting-vehicle 100S. The allocation unit 212 deletes the unmanned driving Internet Protocol address X assigned to the scheduled starting-vehicle 100S from the address list LI. The address list LI is a list indicating the unmanned driving Internet Protocol address X that is not assigned to any vehicle 100 and can be assigned to the vehicle 100S to be started.

The release unit 213 determines whether or not the scheduled end vehicle 100E has reached the end point EP at which the control of the unmanned driving is ended, using the position information of the scheduled end vehicle 100E scheduled to end the control of the unmanned driving. Accordingly, the release unit 213 determines whether or not the control of the unmanned driving has been completed. When it is determined that the scheduled end vehicle 100E has ended the control of the unmanned driving, the release unit 213 releases the unmanned driving Internet Protocol address X assigned to the scheduled end vehicle 100E in order to move the scheduled end vehicle 100E by the unmanned driving. The release unit 213 transmits a release notification indicating the released unmanned driving Internet Protocol address X to the scheduled completion vehicle 100E. The release unit 213 adds the released unmanned driving Internet Protocol address X to the address list LI stored in the memory 202 of the server 200.

The notification control unit 214 notifies the user, such as the administrator, of the error information via the notification unit 190 when there is a problem in managing the unmanned driving Internet Protocol address X. For example, the notification control unit 214 displays error information as character information on a display as the notification unit 190 to notify the user of the error information. The notification control unit 214 may notify the user of the error information by reproducing the error information as the voice information from the speaker as the notification unit 190. The notification control unit 214 may notify the user of the error information by operating various in-vehicle devices as the notification unit 190 in accordance with a predetermined pattern. In the present embodiment, the notification control unit 214 notifies the user of the error information when a predetermined specified time has elapsed since the time point at which the vehicle 100 starts the unmanned driving control, and when the unmanned driving Internet Protocol address X assigned to one vehicle 100 is assigned to one vehicle 100 without being released. In this case, the specific time is determined based on, for example, a tact time for a specific manufacturing process.

The remote control unit 215 generates a travel control signal for controlling the actuator group 120 of the vehicle 100, and transmits a travel control signal to the vehicle 100 to cause the vehicle 100 to travel by remote control.

FIG. 3 is a flowchart illustrating a processing procedure of travel control of the vehicle 100 according to the first embodiment.

In S1, the processor 201 of the server 200 acquires the vehicle position information by using at least one of the detection result output from the external sensor 300 and the detection result output from the internal sensor 180. The vehicle position information is position information that is a basis for generating a travel control signal. In the present embodiment, the vehicle position information includes the position and orientation of the vehicle 100 in the global coordinate system GC of the factory FC. For example, in S1, the processor 201 acquires vehicle-position data using captured images acquired from cameras that are the external sensors 300.

Specifically, in S1, for example, the processor 201 detects the outer shape of the vehicle 100 from the captured image, and calculates the coordinates of the positioning point of the vehicle 100 in the coordinate system of the captured image. The coordinate system of the captured image is a local coordinate system. The processor 201 obtains the position of the vehicle 100 by converting the calculated coordinates into coordinates in the global coordinate system GC. The outline of the vehicle 100 included in the captured image can be detected by, for example, inputting the captured image into a detection model DM using artificial intelligence. The detection model DM is prepared in the system 50 or outside the system 50, for example, and stored in the memory 202 of the server 200 in advance. Examples of the detection model DM include a learned machine learning model that is learned so as to realize one of semantic segmentation and instance segmentation. As the machine learning model, for example, a convolutional neural network (hereinafter referred to as a CNN) learned by supervised learning using a learning dataset can be used. The training data set includes, for example, a plurality of training images including the vehicle 100 and a label indicating which of the regions in the training image indicates the vehicle 100 and the regions other than the vehicle 100. When CNN is learned, the parameters of CNN are preferably updated by back propagation so as to reduce the error between the output-result and-label due to the detection model DM. Further, the processor 201 can obtain the direction of the vehicle 100 by estimating the direction of the movement vector of the vehicle 100 calculated from the position change of the feature point of the vehicle 100 between the frames of the captured image using, for example, the optical flow method.

In S2, the processor 201 of the server 200 determines the target location to which the vehicles 100 should be heading next. In the present embodiment, the target position is represented by the coordinates of X, Y, Z in the global coordinate system GC. In the memory 202 of the server 200, reference route RR that is a route on which the vehicles 100 should travel is stored in advance. The route is represented by a node indicating a start point, a node indicating a passing point, a node indicating a destination, and a link connecting the respective nodes. The processor 201 uses the vehicle position information and the reference route RR to determine the target position to which the vehicle 100 is to be directed next. The processor 201 determines the target position on the reference route RR ahead of the current position of the vehicles 100.

In S3, the processor 201 of the server 200 generates a travel control signal for causing the vehicle 100 to travel toward the determined target position. The processor 201 calculates the traveling speed of the vehicle 100 from the transition of the position of the vehicle 100, and compares the calculated traveling speed with the target speed. The processor 201 generally determines the acceleration so that the vehicle 100 accelerates when the travel speed is lower than the target speed, and determines the acceleration so that the vehicle 100 decelerates when the travel speed is higher than the target speed. In addition, the processor 201 determines the steering angle and the acceleration so that the vehicle 100 does not deviate from the reference route RR when the vehicle 100 is located on the reference route RR. When the vehicle 100 is not located on the reference route RR, in other words, when the vehicle 100 deviates from the reference route RR, the processor 201 determines the steering angle and the acceleration so that the vehicle 100 returns to the reference route RR.

In S4, the processor 201 of the server 200 transmits the generated travel control signal to the vehicles 100. The processor 201 repeats acquisition of vehicle position information, determination of a target position, generation of a travel control signal, transmission of a travel control signal, and the like at predetermined intervals.

In S5, the processor 111 of the vehicle 100 receives the travel control signal transmitted from the server 200. In S6, the processor 111 of the vehicle 100 controls the actuator group 120 using the received travel control signal, thereby causing the vehicle 100 to travel at the acceleration and the steering angle represented by the travel control signal. The processor 111 repeatedly receives the travel control signal and controls the actuator group 120 at a predetermined cycle. According to the system 50 of the present embodiment, the vehicle 100 can be driven by remote control, and the vehicle 100 can be moved without using a conveyance facility such as a crane or a conveyor.

FIG. 4 is a flow chart illustrating an exemplary process for allocating an unmanned driving Internet Protocol address X. The process illustrated in FIG. 4 is executed, for example, when there is a 100S of vehicles to be started.

In S101, the scheduled starting vehicle 100S transmits the detection result of the internal sensor 180 to the server 200 using the unique Internet Protocol address Y. In another embodiment, 100S of vehicles to be started may transmit the position information acquired by using the detection result of the internal sensor 180 to the server 200. In S102, the acquisition unit 211 of the server 200 acquires the position information of the scheduled start vehicle 100S by using the detection result of the internal sensor 180 received from the scheduled start vehicle 100S. In S103, the allocation unit 212 determines whether or not the scheduled start vehicle 100S has reached the start point SP using the position information of the scheduled start vehicle 100S. When it is determined that the scheduled start vehicle 100S has reached the start point SP (S103: Yes), the allocation unit 212 confirms, in S104, whether or not there is an unmanned driving Internet Protocol address X that can be assigned to the scheduled start vehicle 100S by referring to the address list LI.

When there is unmanned driving Internet Protocol address X that can be allocated to the scheduled starting vehicle 100S (S104: Yes), the allocation unit 212 executes S105. In S105, the allocation unit 212 assigns, to the scheduled start vehicle 100S, an unmanned driving Internet Protocol address X that can be assigned to the scheduled start vehicle 100S. At S106, the allocation unit 212 transmits the assignment notification to the scheduled starting-vehicle 100S. In S107, the allocation unit 212 deletes the unmanned driving Internet Protocol address X assigned to the scheduled starting-vehicle 100S from the address list LI. When the scheduled start vehicle 100S receives the assignment notification (S108: Yes), the setting unit 115 of the vehicle control device 110 mounted on the scheduled start vehicle 100S executes S109. In S109, the setting unit 115 sets the unmanned driving Internet Protocol address X assigned by the server 200 as an Internet Protocol address used for communication with the outside.

When the unmanned driving Internet Protocol address X that can be assigned to the scheduled starting vehicle 100S does not exist (S104: No), the notification control unit 214 of the server 200 determines whether or not a trouble has occurred in managing the unmanned driving Internet Protocol address X. When a predetermined time has elapsed from the control start point at which one of the vehicles 100 started the control of the unmanned driving (S110: Yes), the notification control unit 214 notifies the user of the error information in S111 by the notification control unit 214.

Figure 5:
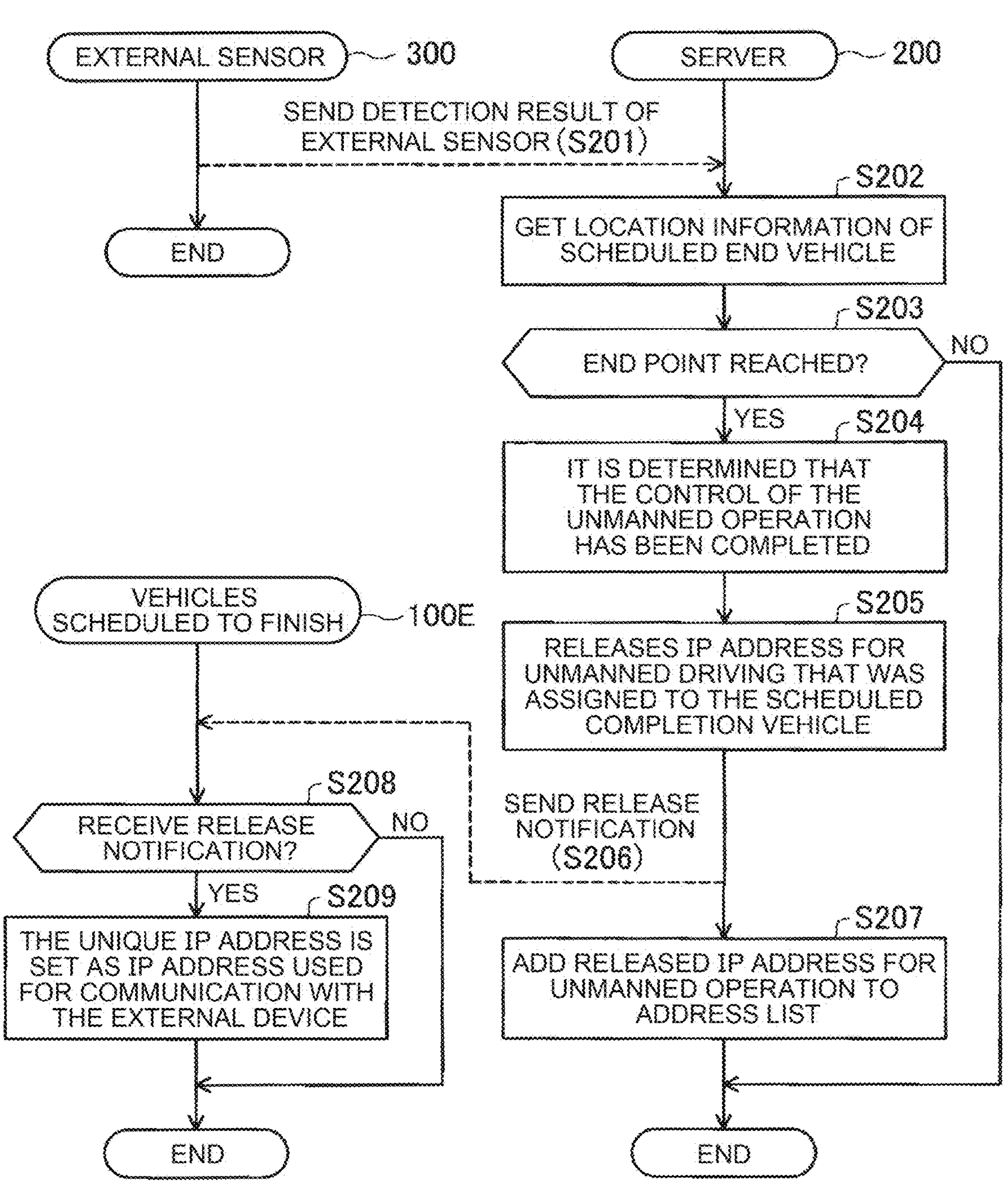
FIG. 5 is a flow chart illustrating a method for releasing an unmanned driving Internet Protocol addressing.

FIG. 5 is a flow chart illustrating a method of releasing the unmanned driving Internet Protocol address X. The process illustrated in FIG. 5 is executed, for example, when a scheduled termination-vehicle 100E exists.

In S201, the external sensor 300 including the scheduled completion-vehicle 100E in the detection area transmits the detection result to the server 200. In S202, the acquisition unit 211 of the server 200 acquires the position information of the scheduled ending-vehicle 100E by using the detection result of the external sensor 300. In S203, the release unit 213 determines whether or not the scheduled ending vehicle 100E has reached the end point EP using the position information of the scheduled ending vehicle 100E. When it is determined that the scheduled ending vehicle 100E has reached the end point EP (S203: Yes), the release unit 213 determines that the scheduled ending vehicle 100E has ended the control of the unmanned driving in S204. In S205, the release unit 213 releases the unmanned driving Internet Protocol address X assigned to the scheduled ending vehicle 100E in order to move the scheduled ending vehicle 100E by unmanned driving. At S206, the release unit 213 transmits the release notification to the scheduled termination-vehicle 100E. In S207, the release unit 213 adds the released unmanned driving Internet Protocol address X to the address list LI. When the scheduled completion vehicle 100E receives the release notification (S208: Yes), the setting unit 115 of the vehicle control device 110 mounted on the scheduled completion vehicle 100E executes S209. In S209, the setting unit 115 sets the unique Internet Protocol address Y stored in the memory 112 as an Internet Protocol address used for communication with the outside.

According to the above-described embodiment, the management device 70 can determine whether or not the control of the unmanned driving of one vehicle 100 has been completed by using the position information of one vehicle 100. When determining that the control of the unmanned driving has been completed, the management device 70 can release the unmanned driving Internet Protocol address X assigned to one vehicle 100 in order to move one vehicle 100. Then, the management device 70 can assign the released unmanned driving Internet Protocol address X to the other vehicles 100 that are scheduled to initiate the control of the unmanned driving. As described above, the management device 70 can assign the limited unmanned driving Internet Protocol address X to the vehicle 100 without duplication in order to move the vehicle 100 by the unmanned driving.

Further, according to the above-described embodiment, the management device 70 can notify the user of the error information when a predetermined time has elapsed since the time point at which the vehicle 100 starts the unmanned driving control, and when the unmanned driving Internet Protocol address X assigned to one vehicle 100 is assigned to one vehicle 100 without being released.

In addition, according to the above-described embodiment, the vehicles 100 can set Internet Protocol addresses to be used for communication with the outside in accordance with the assignment notification and the cancellation notification received from the server 200. Accordingly, when the vehicle 100 travels in the target section TA, the vehicle can communicate with the outside using unmanned driving Internet Protocol address X. When the vehicle 100 travels in the non-target section NA, the vehicle can communicate with the outside using the unique Internet Protocol address Y. The types and numbers of Internet Protocol addresses that can be used by the vehicles 100 are not limited to the above.

B. Second Embodiment

Figure 6:
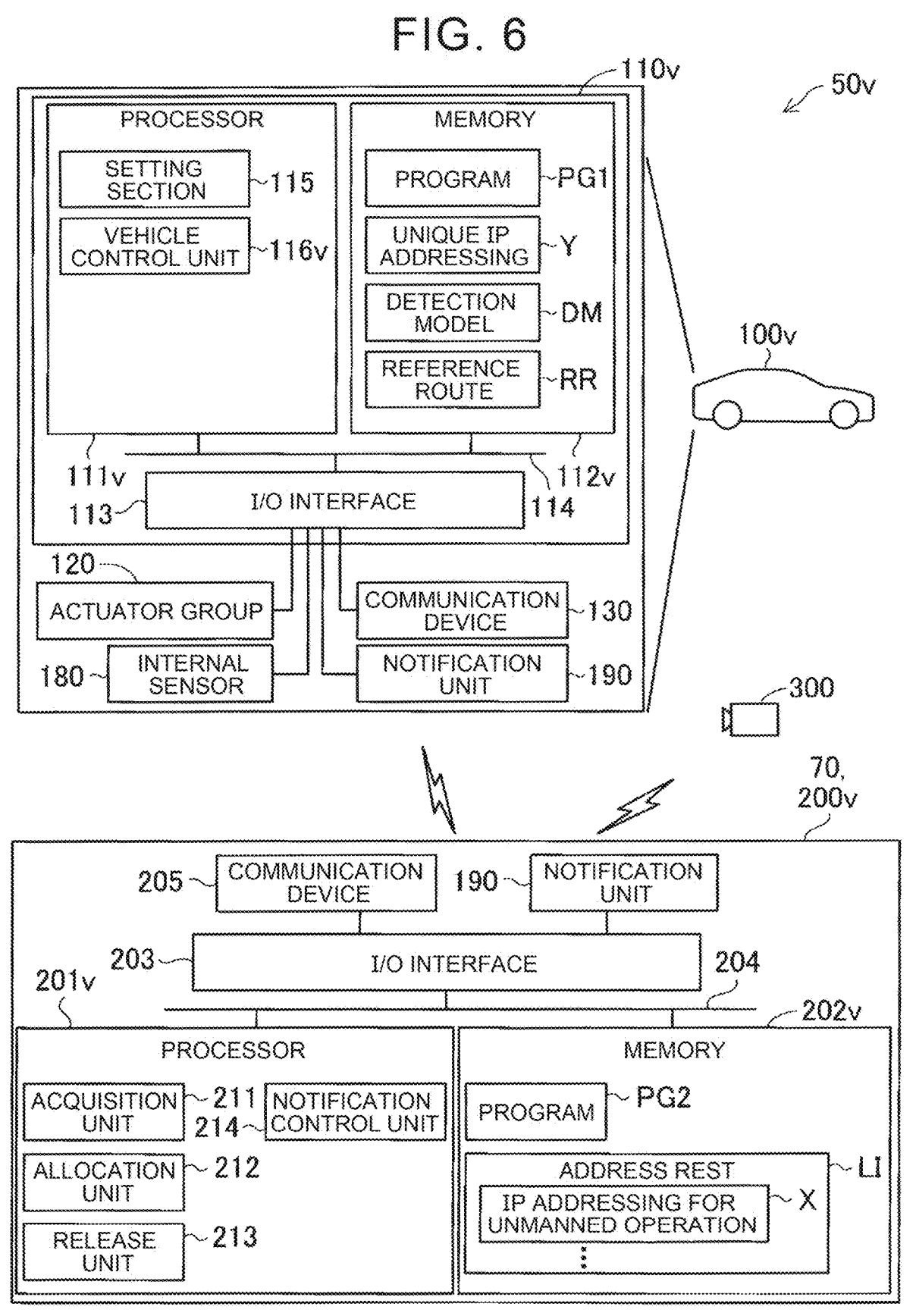

FIG. 6 is an explanatory diagram illustrating a schematic configuration of a system 50*v* according to the second embodiment. The system 50*v* includes one or more vehicle 100*v*, one or more external sensors 300, and a server 200*v* that implements the functions of the management device 70. The present embodiment differs from the first embodiment in that the system 50*v* does not include the remote control device 80. Further, the vehicle 100*v* according to the present embodiment can travel by autonomous control of the vehicle 100*v*. Other configurations are the same as those of the first embodiment unless otherwise described.

The processor 111*v* of the vehicle control device 110*v* functions as the setting unit 115 and the vehicle control unit 116*v* by executing the program PG1 stored in the memory 112*v*. The vehicle control unit 116*v* can cause the vehicle 100*v* to travel by autonomous control by acquiring an output result from the sensor, generating a travel control signal using the output result, and outputting the generated travel control signal to operate the actuator group 120. In the present embodiment, in addition to the program PG1, the memory 112*v* stores the detection model DM, the reference route RR, and the unique Internet Protocol address Y in advance.

The processor 201*v* of the server 200*v* functions as the acquisition unit 211, the allocation unit 212, the release unit 213, and the notification control unit 214 by executing the program PG2 stored in the memory 202*v*. In the present embodiment, the address list LI is stored in the memory 112*v* in addition to the program PG1.

Figure 7:
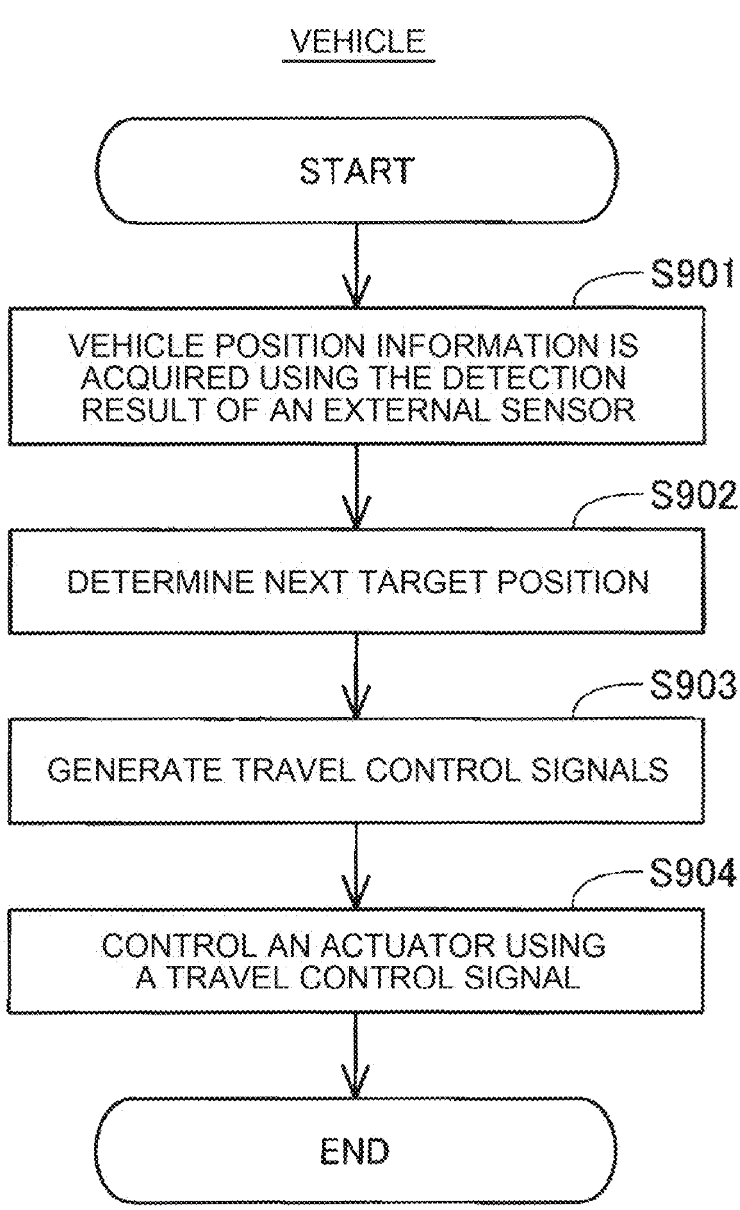
FIG. 7 is a flowchart illustrating a processing procedure of travel control of the vehicle according to the second embodiment.

FIG. 7 is a flow chart showing a process sequence of travel control of the vehicle 100*v* according to the second embodiment.

In S901, the processor 111*v* of the vehicle control device 110*v* acquires the vehicle position information using the detection result outputted from the camera as the external sensor 300. In S902, the processor 111*v* determines the target position to which the vehicle 100*v* should be headed next. In S903, the processor 111*v* generates a travel control signal for causing the vehicle 100*v* to travel toward the determined target position. In S904, the processor 111*v* controls the actuator group 120 by using the generated travel control signal, thereby causing the vehicle 100*v* to travel in accordance with the parameter represented by the travel control signal. The processor 111*v* repeats acquiring the vehicle position information, determining the target position, generating the travel control signal, and controlling the actuator at a predetermined cycle. According to the system 50*v* of the present embodiment, the vehicle 100*v* can be driven by the autonomous control of the vehicle 100*v* without remotely controlling the vehicle 100*v* by the server 200.

C. Other Embodiments (C1) The notification control unit 214 may notify the user of the error information when a predetermined time has elapsed since the time point at which the unmanned driving Internet Protocol address X is assigned to one vehicle 100, and when the unmanned driving Internet Protocol address X assigned to one vehicle 100 is assigned to one vehicle 100 without being released. With such a configuration, the management device 70 can determine whether or not the management of the unmanned driving Internet Protocol address X is hindered in accordance with the use duration of the unmanned driving Internet Protocol address X.

(C2) The notification control unit 214 may notify the user of the error information when the number of vehicles 100 executing the control of the unmanned driving does not coincide with the number of the unmanned driving Internet Protocol addresses X assigned to the vehicles 100. With such a configuration, the management device 70 can determine whether or not the management of the unmanned driving Internet Protocol address X is impaired by comparing the number of vehicles 100 that are executing the control of the unmanned driving with the number of the unmanned driving Internet Protocol addresses X assigned to the vehicles 100.

(C3) In each of the above-described embodiments, the external sensor 300 is not limited to a camera, and may be, for example, a distance measuring device. The distance measuring device is, for example, a Light Detection and Ranging (LiDAR). The external sensor 300 may be a three-dimensional point cloud representing 100, 100*v* of vehicles. In this case, the server 200, 200*v* and the vehicle 100, 100*v* may acquire the vehicle position information by template matching using the three-dimensional point cloud data and the reference-point cloud data prepared in advance.

(C4) In the first embodiment, the server 200 executes processing from acquisition of vehicle position information to generation of a travel control signal. On the other hand, at least a part of the processing from the acquisition of the vehicle position information to the generation of the travel control signal may be executed by the vehicle 100. For example, the following forms (1) to (3) may be used.

(1) The server 200 may acquire the vehicle position information, determine a target position to which the vehicle 100 should be heading next, and generate a route from the current position of the vehicle 100 represented by the acquired vehicle position information to the target position. The server 200 may generate a route to a target position between the current location and the destination, or may generate a route to the destination. The server 200 may transmit the generated route to the vehicle 100. The vehicle 100 may generate a travel control signal so that the vehicle 100 travels on the route received from the server 200, and control the actuator group 120 using the generated travel control signal.

(2) The server 200 may acquire the vehicle position information and transmit the acquired vehicle position information to the vehicle 100. The vehicle 100 may determine a target position to which the vehicle 100 should be directed next, generate a route from the current position of the vehicle 100 represented by the received vehicle position information to the target position, generate a travel control signal so that the vehicle 100 travels on the generated route, and control the actuator group 120 using the generated travel control signal.

(3) In the above embodiments (1) and (2), the internal sensor 180 may be mounted on the vehicle 100, and a detection result output from the internal sensor 180 may be used for at least one of generation of a route and generation of a travel control signal. For example, in the embodiment (1), the server 200 may acquire the detection result of the internal sensor 180 and reflect the detection result of the internal sensor 180 in the path when generating the path. In the embodiment (1), the vehicle 100 may acquire the detection result of the internal sensor 180 and reflect the detection result of the internal sensor 180 in the travel control signal when generating the travel control signal. In the aspect (2), the vehicle 100 may acquire the detection result of the internal sensor 180 and reflect the detection result of the internal sensor 180 on the route when generating the route. In the embodiment (2), the vehicle 100 may acquire the detection result of the internal sensor 180 and reflect the detection result of the internal sensor 180 in the travel control signal when generating the travel control signal.

(C5) In the second embodiment, the internal sensor 180 may be mounted on the vehicle 100*v*, and the detection result outputted from the internal sensor 180 may be used for at least one of the generation of the route and the generation of the travel control signal.

For example, the vehicle 100*v* may acquire the detection result of the internal sensor 180 and reflect the detection result of the internal sensor 180 in the route when generating the route. The vehicle 100*v* may acquire the detection result of the internal sensor 180 and reflect the detection result of the internal sensor 180 in the travel control signal when generating the travel control signal.

(C6) In the second embodiment, the vehicle 100*v* acquires the vehicle position information using the detection result of the external sensor 300. On the other hand, the internal sensor 180 is mounted on the vehicle 100*v*, and the vehicle 100*v* may acquire the vehicle position information using the detection result of the internal sensor 180, determine the target position to which the vehicle 100*v* should be directed next, generate a route from the current position of the vehicle 100*v* represented in the acquired vehicle position information to the target position, generate a travel control signal for traveling on the generated route, and control the actuator group 120 using the generated travel control signal. In this case, the vehicle 100v can travel without using the detection result of the external sensor 300 at all. The vehicle 100v may acquire the target arrival time and the traffic jam information from the outside of the vehicle 100v and reflect the target arrival time and the traffic jam information on at least one of the route and the travel control signal.

(C7) In the first embodiment, the server 200 automatically generates a travel control signal to be transmitted to the vehicle 100. On the other hand, the server 200 may generate a travel control signal to be transmitted to the vehicle 100 in accordance with an operation of an external operator located outside the vehicle 100. For example, an external operator may operate a control device including a display for displaying a captured image output from the external sensor 300, a steering for remotely controlling the vehicle 100, an accelerator pedal, a brake pedal, and a communication device for communicating with the server 200 through wired communication or wireless communication, and the server 200 may generate a travel control signal corresponding to an operation applied to the control device.

(C8) In the above-described embodiments, the vehicle 100, 100v may have a configuration that can be moved by unmanned driving, and may be, for example, in the form of a platform that includes the configuration described below. Specifically, the vehicle 100, 100v may include at least a vehicle control device 110, 110v and an actuator group 120 in order to perform three functions of "running," "turning," and "stopping" by unmanned driving. When the vehicle 100, 100v acquires information from the outside for unmanned driving, the vehicle 100, 100v may further include a communication device 130. That is, in the vehicle 100, 100v that can be moved by unmanned driving, at least a part of an interior component such as a driver's seat or a dashboard may not be mounted, at least a part of an exterior component such as a bumper or a fender may not be mounted, and a body shell may not be mounted. In this case, the remaining components such as the body shell may be mounted on the vehicle 100, 100v until the vehicle 100, 100v is shipped from the factory FC, or the remaining components such as the body shell may be mounted on the vehicle 100, 100v after the vehicle 100, 100v is shipped from the factory FC while the remaining components such as the body shell are not mounted on the vehicle 100, 100v. Each component may be attached from any direction, such as the upper, lower, front, back, right, or left side of the vehicle 100, 100v, may be attached from the same direction, each may be attached from different directions. It should be noted that the position determination can be performed in the same manner as in the vehicle 100, 100v according to the first embodiment.

(C9) The vehicle 100, 100v may be manufactured by combining a plurality of modules. Modules refer to units composed of one or more components grouped according to the configuration and function of the vehicle 100, 100v. For example, the platform of the vehicle 100, 100v may be manufactured by combining a front module that constitutes a front portion of the platform, a central module that constitutes a central portion of the platform, and a rear module that constitutes a rear portion of the platform. The number of modules constituting the platform is not limited to three, and may be two or less or four or more. Also, in addition to or instead of the platform, parts of the vehicle 100, 100v that differ from the platform may be modularized. Further, the various modules may include any exterior parts such as bumpers and grills, and any interior parts such as sheets and consoles. In addition, the present disclosure is not limited to a vehicle 100, 100v, and a mobile body of any aspect may be manufactured by combining a plurality of modules. Such a module may be manufactured, for example, by joining a plurality of parts by welding, a fixture, or the like, or may be manufactured by integrally molding at least a part of the module as one part by casting. Molding techniques for integrally molding at least a portion of a module as one part are also referred to as gigacasts or megacasts. By using the gigacast, each part of the mobile body, which has been conventionally formed by joining a plurality of parts, can be formed as one part. For example, the front module, the central module, and the rear module described above may be manufactured using gigacast.

(C10) Transporting the vehicle 100, 100v by using the traveling of the vehicle 100, 100v by the unmanned driving is also referred to as "self-propelled conveyance". A configuration for realizing self-propelled conveyance is also referred to as a "vehicle remote control autonomous traveling conveyance system". Further, a production method of producing a vehicle 100, 100v by using self-propelled conveyance is also referred to as "self-propelled production". In self-propelled manufacturing, for example, at least a part of the conveyance of the vehicle 100, 100v is realized by self-propelled conveyance in a factory FC that manufactures the vehicle 100, 100v.

The present disclosure is not limited to each of the above embodiments, and can be realized by various configurations without departing from the spirit thereof. For example, the technical features of the embodiments corresponding to the technical features in the respective embodiments described in the Summary of the Disclosure can be appropriately replaced or combined in order to solve some or all of the above-described problems or to achieve some or all of the above-described effects. Further, when the technical features are not described as essential in the present specification, these can be deleted as appropriate.

What is claimed is:

1. A management device that manages Internet Protocol addresses, the management device comprising:
- a release unit that releases an Internet Protocol address allocated to one mobile body to move the one mobile body when control of unmanned driving of the one mobile body is ended; and
- an allocation unit that allocates the released Internet Protocol address to another mobile body, of which the control of the unmanned driving is to be started.

2. The management device according to claim 1, further comprising a notification control unit that notifies a user of error information in at least one of a case where a predetermined time has elapsed from a time point at which the control of unmanned driving of the one mobile body is started and a case where a predetermined time has elapsed from a time point at which the Internet Protocol address is allocated to the one mobile body, and when the Internet Protocol address allocated to the one mobile body is allocated to the one mobile body without being released.

3. The management device according to claim 1, wherein:
- the management device manages a plurality of Internet Protocol addresses; and
- the management device further includes a notification control unit that notifies a user of error information when the number of mobile bodies being subjected to the control of unmanned driving and the number of Internet Protocol addresses allocated to the mobile bodies do not coincide with each other.

4. The management device according to claim 1, wherein:

the mobile body moves for a section from a predetermined start point to an end point through the unmanned driving;

the release unit determines whether the control of unmanned driving of the one mobile body is ended using position information on the one mobile body; and the position information is acquired using at least one of a detection result output from an external sensor that detects the one mobile body from outside and a detection result output from an internal sensor mounted on the mobile body.

5. A management method of managing Internet Protocol addresses, the management method comprising:

releasing an Internet Protocol address allocated to one mobile body to move the one mobile body when control of unmanned driving of the one mobile body is ended; and allocating the released Internet Protocol address to another mobile body, of which the control of the unmanned driving is to be started.

* * * * *